United States Patent
Seo et al.

(10) Patent No.: US 12,315,494 B2
(45) Date of Patent: May 27, 2025

(54) ELECTRONIC DEVICE AND OPERATION METHOD

(71) Applicant: SAMSUNG ELECTRONICS CO., LTD., Suwon-si (KR)

(72) Inventors: Hyunson Seo, Suwon-si (KR); Kartik Khandelwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 17/871,711

(22) Filed: Jul. 22, 2022

(65) Prior Publication Data

US 2023/0030738 A1 Feb. 2, 2023

Related U.S. Application Data

(63) Continuation of application No. PCT/KR2022/010113, filed on Jul. 12, 2022.

(30) Foreign Application Priority Data

Jul. 28, 2021 (KR) .................. 10-2021-0099469

(51) Int. Cl.
  *G10L 15/06* (2013.01)
  *G06F 3/16* (2006.01)
  (Continued)

(52) U.S. Cl.
  CPC ............ *G10L 15/063* (2013.01); *G06F 3/167* (2013.01); *G10L 15/1815* (2013.01);
  (Continued)

(58) Field of Classification Search
  CPC .... G06F 3/167; G06F 16/632; G06F 3/04842; G06F 16/3329; G06F 3/041; G06F 3/16;
  (Continued)

(56) References Cited

U.S. PATENT DOCUMENTS 7,725,419 B2   5/2010 Lee et al.
8,812,317 B2   8/2014 Jang et al.
(Continued)

FOREIGN PATENT DOCUMENTS

CN   110992932 A   4/2020
CN   111292750 A   6/2020
(Continued)

OTHER PUBLICATIONS

PCT International Search Report dated Oct. 28, 2022 for PCT/KR2022/010113.

*Primary Examiner* — Abdelali Serrou
(74) *Attorney, Agent, or Firm* — Nixon & Vanderhye P.C.

(57) ABSTRACT

An electronic device may include a user interface, a processor operatively connected to the user interface, and a memory operatively connected to the processor. The memory may store instructions that, when executed, may cause the processor to identify a modified hotword included in the first user input in response to failing to detect a hotword included in a first user input received using the user interface, to monitor a second user input received during a specified time using the user interface, to identify an existing hotword corresponding to the modified hotword using the second user input, to provide response data indicating whether to update the existing hotword using the modified hotword, through the user interface, and to update a hotword model based on a user input to the response data. Moreover, various example embodiments found through the disclosure, as well as other embodiments, are possible.

14 Claims, 10 Drawing Sheets

(51) Int. Cl.
   *G10L 15/18* (2013.01)
   *G10L 15/22* (2006.01)
   *G10L 15/08* (2006.01)

(52) U.S. Cl.
   CPC ...... *G10L 15/22* (2013.01); *G10L 2015/0635* (2013.01); *G10L 2015/088* (2013.01)

(58) Field of Classification Search
   CPC ........ G06F 40/279; G06F 40/30; G06F 16/33; G06F 16/332; G06F 16/3334; G06F 3/04817; G06F 3/165; G06F 40/237; G06F 11/3452; G06F 16/3343; G06F 40/20; G06F 40/216; G06F 40/268; G10L 15/22; G10L 2015/088; G10L 2015/223; G10L 15/08; G10L 15/30; G10L 15/063; G10L 2025/783; G10L 15/20; G10L 15/26; G10L 15/02; G10L 25/84; G10L 15/18; G10L 2021/02161; G10L 21/0232; G10L 25/51; G10L 15/32; G10L 15/01; G10L 15/285; G10L 17/22; G10L 2015/0631; G10L 2015/0638; G10L 15/1822; G10L 15/183; G10L 25/03; G10L 25/78; G10L 25/87; G10L 15/07; G10L 15/1815; G10L 2015/221; G10L 2015/225; G10L 25/60; G10L 15/00; G10L 15/06; G10L 15/14; G10L 15/187; G10L 17/24; G10L 2015/025; G10L 13/08; G10L 15/04; G10L 19/008; G10L 19/018; G10L 19/16; G10L 2015/0635; G10L 2015/226; G10L 25/69
   See application file for complete search history.

(56) References Cited

U.S. PATENT DOCUMENTS

| | | |
|---|---|---|
| 8,990,688 B2 | 3/2015 | Lee et al. |
| 10,109,276 B2 | 10/2018 | Sharifi |
| 10,186,264 B2 | 1/2019 | Sharifi |
| 10,192,557 B2 | 1/2019 | Lee et al. |
| 10,891,968 B2 | 1/2021 | Chung et al. |
| 11,270,074 B2 | 3/2022 | Iwase et al. |
| 11,450,314 B2 | 9/2022 | Ni et al. |
| 11,450,315 B2 | 9/2022 | Kim et al. |
| 11,551,690 B2 * | 1/2023 | Smith ............... G10L 15/22 |
| 11,557,299 B2 * | 1/2023 | Sharifi ............... G10L 17/22 |
| 11,749,261 B2 * | 9/2023 | Beaufays ............ G10L 15/063 704/235 |
| 11,893,988 B2 * | 2/2024 | Yang ............... G10L 15/05 |
| 11,961,510 B2 * | 4/2024 | Ding ............... G10L 15/063 |
| 2005/0054381 A1 | 3/2005 | Lee et al. |
| 2010/0179812 A1 | 7/2010 | Jang et al. |
| 2012/0265536 A1 | 10/2012 | Paik et al. |
| 2016/0217795 A1 * | 7/2016 | Lee ............... G10L 15/30 |
| 2019/0103103 A1 * | 4/2019 | Ni ............... G10L 15/22 |
| 2019/0115026 A1 | 4/2019 | Sharifi |
| 2019/0371296 A1 * | 12/2019 | Iwase ............... G06F 40/237 |
| 2020/0051554 A1 * | 2/2020 | Kim ............... G06F 3/167 |
| 2020/0234706 A1 | 7/2020 | Sharifi |
| 2022/0293093 A1 * | 9/2022 | Beaufays ............ G10L 15/065 |

FOREIGN PATENT DOCUMENTS

| | | |
|---|---|---|
| KR | 10-2012-0117148 A | 10/2012 |
| KR | 10-2014-0089871 A | 7/2014 |
| KR | 10-1556594 B1 | 10/2015 |
| KR | 10-2016-0055162 A | 5/2016 |
| KR | 10-2018-0084392 A | 7/2018 |
| KR | 10-2020-0012933 A | 2/2020 |
| WO | WO 2019-142427 A1 | 11/2020 |

* cited by examiner

√ : TOUCH INPUT WITHIN T TIME

| | | TASK (901) | HOTWORD1 (902) | HOTWORD2 (903) |
|---|---|---|---|---|
| MEDIA (904) | √ | \<VOLUME UP\> | "VOLUME UP" | "INCREASE VOLUME" |
| | | \<VOLUME DOWN\> | "VOLUME DOWN" | "VOLUME DOWN" |
| | | \<PLAY NEXT SONG\> | "NEXT SONG" | "NEXT SONG" |
| | √ | \<PLAY PREVIOUS SONG\> | "PREVIOUS SONG" | "PREVIOUS SONG" |
| | | \<STOP PLAYBACK\> | "STOP" | "STOP" |
| | | \<START PLAYBACK\> | "PLAY" | "PLAY" |
| | | \<PLAY CURRENT SONG REPEATEDLY INDEFINITELY\> | NA | NA |
| | | \<PLAY SONGS RANDOMLY\> | NA | NA |
| | √ | \<VIEW LYRICS\> | NA | NA |
| | | \<VIEW PLAYLIST\> | NA | NA |
| | | \<SEARCH FOR MUSIC\> | NA | NA |
| PHONE(905) | √ | \<REJECT INCOMING CALL\> | "REJECT" | "REJECT" |
| MESSAGE(906) | | \<SEND MESSAGE\> | "TEXT" | "TEXT" |

FIG.9

ELECTRONIC DEVICE AND OPERATION METHOD

CROSS-REFERENCE TO RELATED APPLICATIONS

This application is a continuation of International Application No. PCT/KR2022/010113 designating the United States, filed on Jul. 12, 2022, in the Korean Intellectual Property Receiving Office and claiming priority to Korean Patent Application No. 10-2021-0099469, filed on Jul. 28, 2021, in the Korean Intellectual Property Office, the disclosures of which are incorporated by reference herein in their entireties.

BACKGROUND

Field

The disclosure relates to an electronic device and an operating method of the electronic device.

Description of Related Art

Nowadays, with the development of artificial intelligence (AI) technology, terminals including AI used for the main purpose of voice assistant are being spread. Furthermore, in addition to a conventional input method using a keyboard or a mouse, electronic devices have recently supported various input methods such as a voice input. For example, the electronic devices such as smart phones or tablet PCs may receive a user voice and then may provide a service that performs an operation corresponding to the received user voice.

The speech recognition service is being developed based on a technology for processing a natural language. The technology for processing a natural language refers to a technology that grasps the intent of a user input (utterance) and generates the result matched with the intent to provide a user with the service. Users naturally give various commands to the AI included in the terminal, or have a conversation with the AI, by using the service.

Accordingly, it is necessary to improve speech recognition performance by using an ASR system applied to a voice assistant. In addition, it is necessary to improve hotword detection performance by utilizing a keyword searcher.

SUMMARY

Embodiments of the disclosure provide a method and device for improving the hotword detection performance of a voice assistant.

Embodiments of the disclosure provide a method and device for improving the hotword detection performance of a voice assistant by using a user input received during a specified time after a hotword fails to be detected.

Embodiments of the disclosure provide a method and device for providing a user with consistent user experience without using a wake-up word.

Embodiments of the disclosure provide a method and device for improving the hotword detection performance of a voice assistant simultaneously while the use of a resource (e.g., a memory or power) of an electronic device is reduced.

Embodiments of the disclosure provide a method and device for detecting a hotword even when the modified hotword is received, by updating a hotword model by using a user input received by the electronic device during a specified time.

According to an example embodiment of the disclosure, an electronic device may include: a user interface, at least one processor operatively connected to the user interface, and a memory operatively connected to the at least one processor. The memory may store instructions that, when executed, are configured to cause the at least one processor to identify a modified hotword included in the first user input in response to failing to detect a hotword included in a first user input received using the user interface, to monitor a second user input received during a specified time using the user interface, to identify an existing hotword corresponding to the modified hotword using the second user input, to provide response data indicating whether to update the existing hotword using the modified hotword, through the user interface, and to update a hotword model based on a user input to the response data.

According to an example embodiment of the disclosure, a method performed by an electronic device may include: identifying a modified hotword included in the first user input in response to failing to detect a hotword included in a first user input received using a user interface included in the electronic device or connected to the electronic device, monitoring a second user input received during a specified time using the user interface, identifying an existing hotword corresponding to the modified hotword using the second user input, providing response data indicating whether to update the existing hotword using the modified hotword, using the user interface, and updating a hotword model based on a user input to the response data.

According to various example embodiments of the disclosure, it is possible to provide a method and device for improving the hotword detection performance of a voice assistant.

According to various example embodiments of the disclosure, it is possible to provide a method and device for improving the hotword detection performance of a voice assistant by using a user input received during a specified time after a hotword fails to be detected.

According to various example embodiments of the disclosure, it is possible to provide a method and device for providing a user with consistent user experience without using a wake-up word.

According to various example embodiments of the disclosure, it is possible to provide a method and device for improving the hotword detection performance of a voice assistant simultaneously while the use of a resource (e.g., a memory or power) of an electronic device is reduced.

According to various example embodiments of the disclosure, it is possible to provide a method and device for detecting a hotword even when the modified hotword is received, by updating a hotword model by using a user input received by the electronic device during a specified time.

Besides, a variety of effects directly or indirectly understood through the specification may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9 is a diagram of a method in which an electronic device determines whether a user input received within a specified time includes an input for execution of a task implemented with a hotword, according to various example embodiments.

With regard to description of drawings, the same or similar components will be marked by the same or similar reference signs.

DETAILED DESCRIPTION

Hereinafter, various example embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
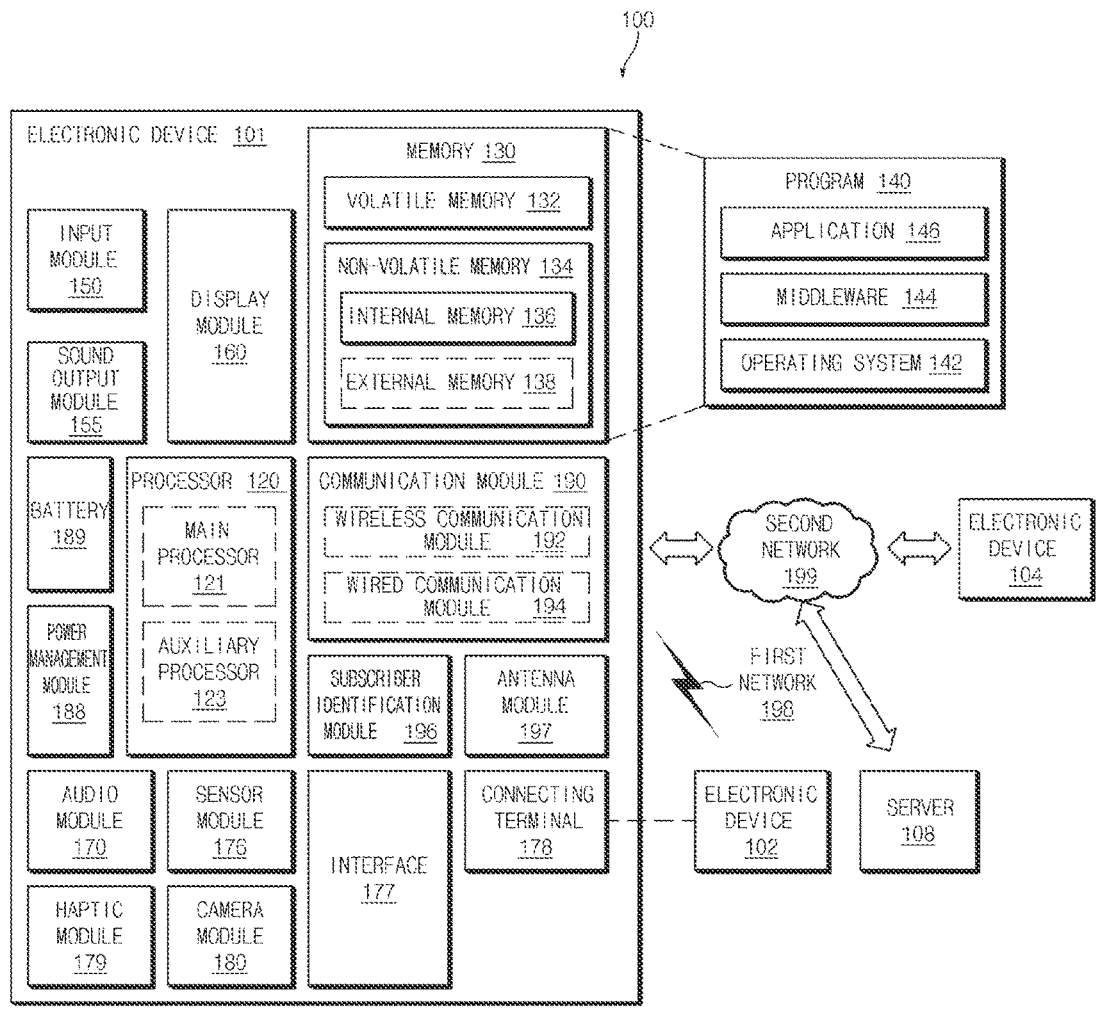
FIG. 1 is a block diagram of an electronic device in a network environment, according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element include a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
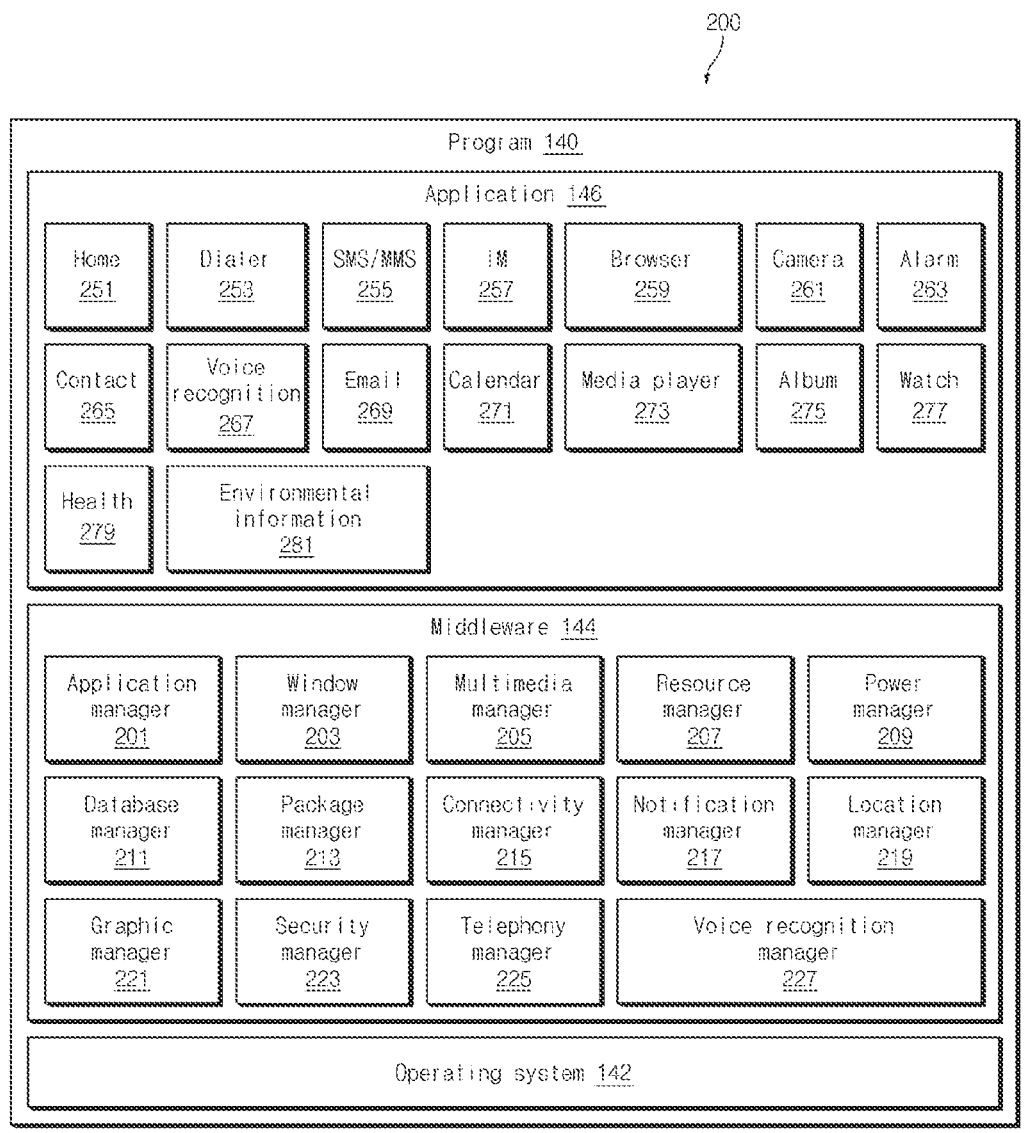
FIG. 2 is a block diagram of a program, according to various example embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
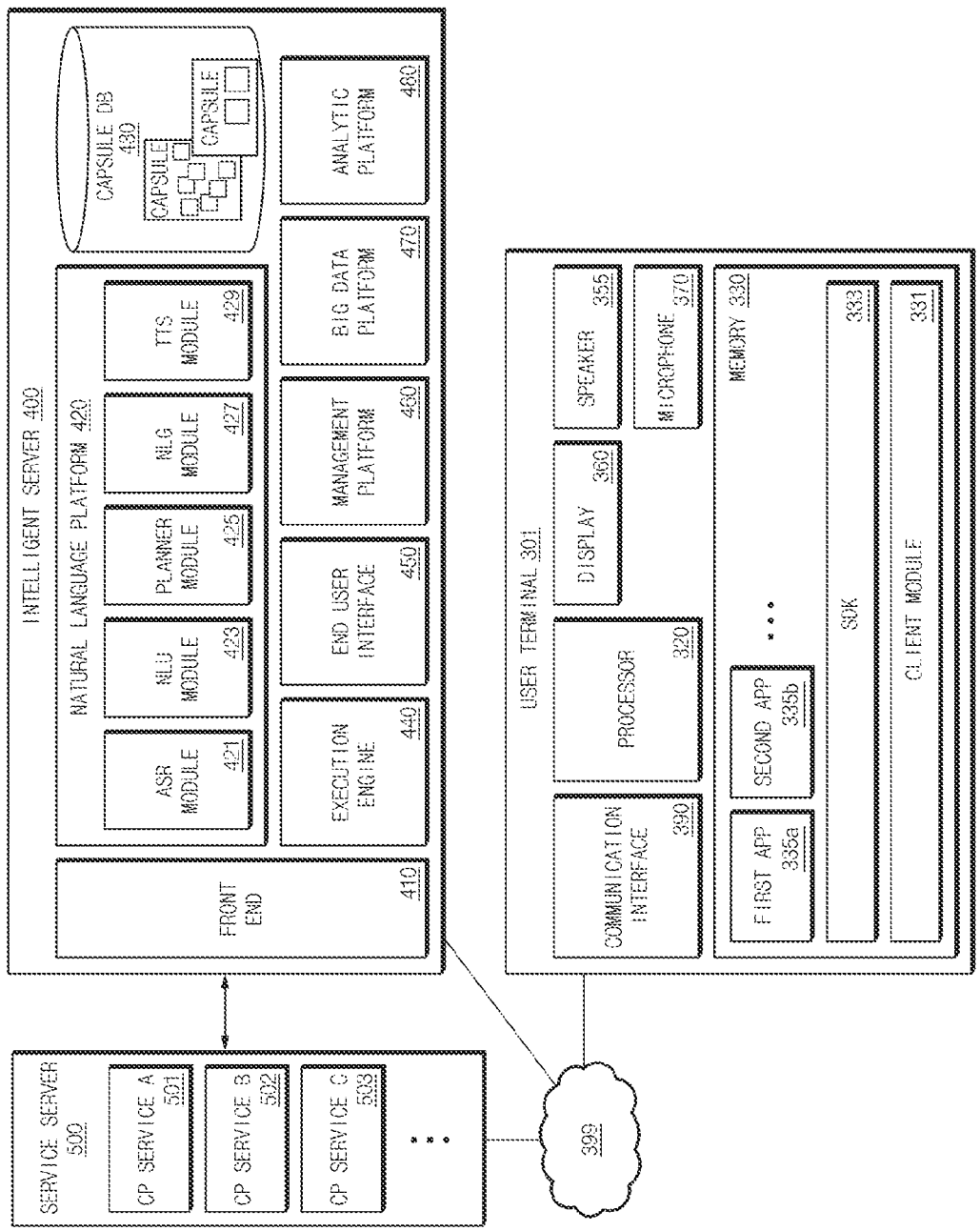
FIG. 3 is a block diagram illustrating an integrated intelligence system, according to various example embodiments.

FIG. 3 is a block diagram illustrating an integrated intelligence system, according to an embodiment.

Referring to FIG. 3, an integrated intelligence system according to an embodiment may include a user terminal 301, an intelligence server 400, and a service server 500.

The user terminal 301 according to an example embodiment may be a terminal device (or an electronic device) capable of connecting to a network 399 such as the Internet, and may be, for example, a mobile phone, a smartphone, a personal digital assistant (PDA), a notebook computer, a television (TV), a household appliance, a wearable device, a head mounted display (HMD), or a smart speaker.

According to the illustrated example embodiment, the user terminal 301 may include a communication interface 390, a microphone 370, a speaker 355, a display 360, a memory 330, or a processor 320 including processing circuitry. The listed components may be operatively or electrically connected to one another.

The communication interface 390 according to an embodiment may be connected to an external device and may be configured to transmit or receive data to or from the external device via network 399. The microphone 370 according to an embodiment may receive a sound (e.g., a user utterance) to convert the sound into an electrical signal. The speaker 355 according to an embodiment may output the electrical signal as sound (e.g., voice). The display 360 according to an embodiment may be configured to display an image or a video. The display 360 according to an embodiment may display the graphic user interface (GUI) of the running app (or an application program).

The memory 330 according to an embodiment may store a client module 331, a software development kit (SDK) 333, and a plurality of apps 335. The client module 331 and the SDK 333 may constitute a framework (or a solution program) for performing general-purposed functions. Furthermore, the client module 331 or the SDK 333 may constitute the framework for processing a voice input.

The plurality of apps 335 may be programs for performing a specified function. According to an embodiment, the plurality of apps may include a first app 335a and/or a second app 335b. According to an embodiment, each of the plurality of apps 335 may include a plurality of actions for performing a specified function. For example, the apps may include an alarm app, a message app, and/or a schedule app. According to an embodiment, the plurality of apps 355a and 355b (e.g., see FIG. 3) may be executed by the processor 320 to sequentially execute at least part of the plurality of actions.

According to an embodiment, the at least one processor 320 including processing circuitry may control overall operations of the user terminal 301. For example, the processor 320 may be electrically connected to the communication interface 390, the microphone 370, the speaker 355, and the display 360 so as to perform a specified operation. For example, the processor 320 may include at least one processor.

Moreover, the processor 320 according to an embodiment may execute the program stored in the memory 330 so as to perform a specified function. For example, according to an embodiment, the processor 320 may execute at least one of the client module 331 or the SDK 333 so as to perform a following operation for processing a voice input. The processor 320 may control operations of the plurality of apps 335 via the SDK 333. The following actions described as the actions of the client module 331 or the SDK 333 may be the actions performed by the execution of the processor 320.

According to an embodiment, the client module 331 may receive a voice input. For example, the client module 331 may receive a voice signal corresponding to a user utterance detected through the microphone 370. The client module 331 may transmit the received voice input (e.g., a voice input) to the intelligence server 400. The client module 331 may transmit state information of the user terminal 301 to the intelligence server 400 together with the received voice input. For example, the state information may be execution state information of an app.

According to an embodiment, the client module 331 may receive a result corresponding to the received voice input. For example, when the intelligence server 400 is capable of calculating the result corresponding to the received voice input, the client module 331 may receive the result corresponding to the received voice input. The client module 331 may display the received result on the display 360.

According to an embodiment, the client module 331 may receive a plan corresponding to the received voice input. The client module 331 may display, on the display 360, a result of executing a plurality of actions of an app depending on the plan. For example, the client module 331 may sequentially display the result of executing the plurality of actions on a display. As another example, the user terminal 301 may display only a part of results (e.g., a result of the last action) of executing the plurality of actions, on the display.

According to an embodiment, the client module 331 may receive a request for obtaining information necessary to calculate the result corresponding to a voice input, from the intelligence server 400. According to an embodiment, the client module 331 may transmit the necessary information to the intelligence server 400 in response to the request.

According to an embodiment, the client module 331 may transmit, to the intelligence server 400, information about the result of executing a plurality of actions depending on the plan. The intelligence server 400 may identify that the received voice input is correctly processed, using the result information.

According to an embodiment, the client module 331 may include a speech recognition module (e.g., including speech recognition circuitry). According to an embodiment, the client module 331 may recognize a voice input for performing a limited function, via the speech recognition module. For example, the client module 331 may launch an intelligence app for processing a specific voice input by performing an organic action, in response to a specified voice input (e.g., wake up!).

According to an embodiment, the intelligence server 400 may receive information associated with a user's voice input from the user terminal 301 over a communication network 399. According to an embodiment, the intelligence server 400 may convert data associated with the received voice input to text data. According to an embodiment, the intelligence server 400 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 400 may transmit a result according to the generated plan to the user terminal 301 or may transmit the generated plan to the user terminal 301. According to an embodiment, the user terminal 301 may display the result according to the plan, on a display. According to an embodiment, the user terminal 301 may display a result of executing the action according to the plan, on the display.

The intelligence server 400 according to an embodiment may include a front end 410, a natural language platform 420, a capsule database 430, an execution engine 440, an end user interface 450, a management platform 460, a big data platform 470, or an analytic platform 480.

According to an embodiment, the front end 410 may receive a voice input received from the user terminal 301. The front end 410 may transmit a response corresponding to the voice input to the user terminal 301.

According to an embodiment, the natural language platform 420 may include an automatic speech recognition (ASR) module 421, a natural language understanding (NLU) module 423, a planner module 425, a natural language generator (NLG) module 427, and/or a text to speech module (TTS) module 429.

According to an embodiment, the ASR module 421 may convert the voice input received from the user terminal 301 into text data. According to an embodiment, the NLU module 423 may grasp the intent of the user, using the text data of the voice input. For example, the NLU module 423 may grasp the intent of the user by performing syntactic analysis or semantic analysis. According to an embodiment, the NLU module 423 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 425 may generate the plan by using a parameter and the intent that is determined by the NLU module 423. According to an embodiment, the planner module 425 may determine a plurality of domains necessary to perform a task, based on the determined intent. The planner module 425 may determine a plurality of actions included in each of the plurality of domains determined based on the intent. According to an embodiment, the planner module 425 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 425 may determine the relationship between the plurality of actions and the plurality of concepts stepwise (or hierarchically). For example, the planner module 425 may determine the execution sequence of the plurality of actions, which are determined based on the user's intent, based on the plurality of concepts. In other words, the planner module 425 may determine an execution sequence of the plurality of actions, based on the parameters necessary to perform the plurality of actions and the result output by the execution of the plurality of actions. Accordingly, the planner module 425 may generate a plan including information (e.g., ontology) about the relationship between the plurality of actions and the plurality of concepts. The planner module 425 may generate the plan by using information stored in the capsule DB 430 storing a set of relationships between concepts and actions.

According to an embodiment, the NLG module 427 may change specified information into information in a text form. The information changed to the text form may be in the form of a natural language speech. The TTS module 429 according to an embodiment may change information in the text form to information in a voice form.

According to an embodiment, all or part of the functions of the natural language platform 420 may be also implemented in the user terminal 301.

The capsule DB 430 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 430 may store the plurality of capsules in a form of a concept action network (CAN). According to an embodiment, the plurality of capsules may be stored in the function registry included in the capsule DB 430.

The capsule DB 430 may include a strategy registry that stores strategy information necessary to determine a plan corresponding to a voice input. When there are a plurality of plans corresponding to the voice input, the strategy information may include reference information for determining one plan. According to an embodiment, the capsule DB 430 may include a follow-up registry that stores information of the follow-up action for suggesting a follow-up action to the user in a specified context. For example, the follow-up action may include a follow-up utterance. According to an embodiment, the capsule DB 430 may include a layout registry storing layout information of information output via the user terminal 301. According to an embodiment, the capsule DB 430 may include a vocabulary registry storing vocabulary information included in capsule information. According to an embodiment, the capsule DB 430 may include a dialog registry storing information about dialog (or interaction) with the user. The capsule DB 430 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 430 according to an embodiment may be also implemented in the user terminal 301.

According to an embodiment, the execution engine 440 may calculate a result by using the generated plan. The end user interface 450 may transmit the calculated result to the user terminal 301. Accordingly, the user terminal 301 may receive the result and may provide the user with the received result. According to an embodiment, the management platform 460 may manage information used by the intelligence server 400. According to an embodiment, the big data platform 470 may collect data of the user. According to an embodiment, the analytic platform 480 may manage quality of service (QoS) of the intelligence server 400. For example, the analytic platform 480 may manage the component and processing speed (or efficiency) of the intelligence server 400.

According to an embodiment, the service server 500 may provide the user terminal 301 with a specified service (e.g., ordering food or booking a hotel). According to an embodiment, the service server 500 may be a server operated by the third party. According to an embodiment, the service server 500 may provide the intelligence server 400 with information for generating a plan corresponding to the received voice input. The provided information may be stored in the capsule DB 430. Furthermore, the service server 500 may provide the intelligence server 400 with result information according to the plan. The at least one service server 500 may support various service providers, such as CP Service A 501, CP Service B 502, and/or CP Service C 503, etc.

In the above-described integrated intelligence system, the user terminal 301 may provide the user with various intelligent services in response to a user input. The user input may include, for example, an input through a physical button, a touch input, or a voice input.

According to an embodiment, the user terminal 301 may provide a speech recognition service via an intelligence app (or a speech recognition app) stored therein. In this case, for example, the user terminal 301 may recognize a user utterance or a voice input, which is received via the microphone, and may provide the user with a service corresponding to the recognized voice input.

According to an embodiment, the user terminal 301 may perform a specified action, based on the received voice input, independently, or together with the intelligence server and/or the service server. For example, the user terminal 301 may launch an app corresponding to the received voice input and may perform the specified action via the executed app.

In an embodiment, when providing a service together with the intelligence server 400 and/or the service server, the user terminal 301 may detect a user utterance by using the microphone 370 and may generate a signal (or voice data) corresponding to the detected user utterance. The user terminal may transmit the voice data to the intelligence server 400 by using the communication interface 390.

According to an embodiment, the intelligence server 400 may generate a plan for performing a task corresponding to the voice input or the result of performing an action depending on the plan, as a response to the voice input received from the user terminal 301. For example, the plan may include a plurality of actions for performing the task corresponding to the voice input of the user and/or a plurality of concepts associated with the plurality of actions. The concept may define a parameter to be entered upon executing the plurality of actions or a result value output by the execution of the plurality of actions. The plan may include relationship information between the plurality of actions and/or the plurality of concepts.

According to an embodiment, the user terminal 301 may receive the response by using the communication interface 390. The user terminal 301 may output the voice signal generated in the user terminal 301 to the outside by using the speaker 355 or may output an image generated in the user terminal 301 to the outside by using the display 360.

Figure 4:
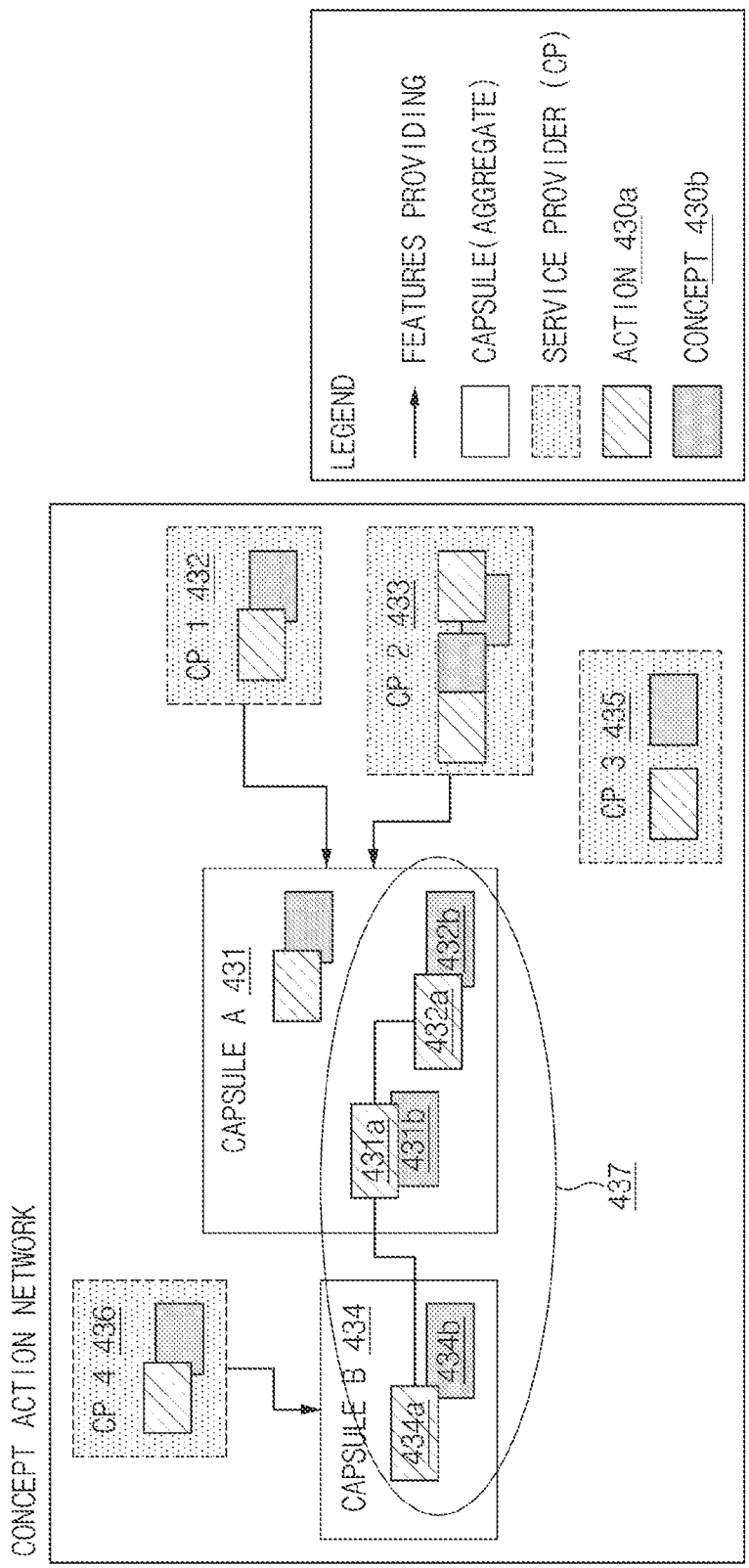
FIG. 4 is a diagram illustrating the form in which relationship information between a concept and an action is stored in a database, according to various example embodiments.

FIG. 4 is a diagram illustrating a form in which relationship information between a concept and an action is stored in a database, according to various embodiments.

A capsule database (e.g., the capsule DB 430) of the intelligence server 400 may store a capsule in the form of a CAN. The capsule DB may store an action for processing a task corresponding to a user's voice input and a parameter necessary for the action, in the CAN form.

The capsule DB may store a plurality capsules (a capsule A 431 and a capsule B 434) respectively corresponding to a plurality of domains (e.g., applications). According to an embodiment, a single capsule (e.g., the capsule A 431) may correspond to a single domain (e.g., a location (geo) or an application). Furthermore, at least one service provider (e.g., CP 1 432, CP 2 433, CP 3 435, and/or CP 4 436) for performing a function for a domain associated with the capsule may correspond to one capsule. According to an embodiment, the one capsule may include at least one or more actions 430a and at least one or more concepts 430b for performing a specified function.

The natural language platform 420 may generate a plan for performing a task corresponding to the received voice input, using the capsule stored in a capsule database. For example, the planner module 425 of the natural language platform may generate the plan by using the capsule stored in the capsule database. For example, a plan 437 may be generated by using actions 431a and 432a and concepts 431b and 432b of the capsule A 431 and an action 434a and a concept 434b of the capsule B 434.

Figure 5:
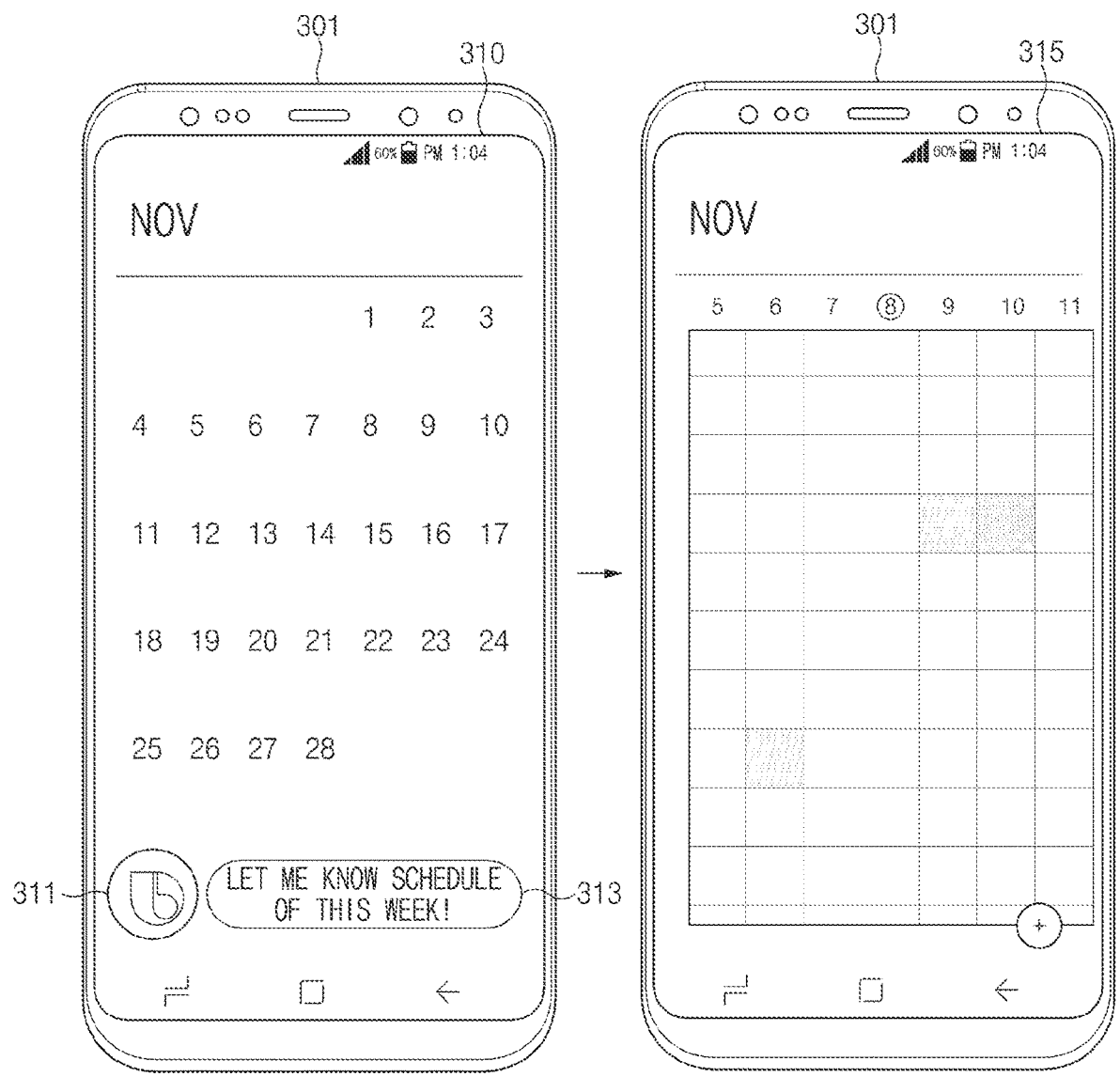
FIG. 5 is a view illustrating a user terminal displaying a screen of processing a voice input received through an intelligence app, according to various example embodiments.

FIG. 5 is a view illustrating a screen in which a user terminal processes a voice input received through an intelligence app, according to various embodiments.

The user terminal 301 may execute an intelligence app to process a user input through the intelligence server 400.

According to an embodiment, on screen 310, when recognizing a specified voice input (e.g., wake up!) or receiving an input via a hardware key (e.g., a dedicated hardware key), the user terminal 301 may launch an intelligence app for processing a voice input. For example, the user terminal 301 may launch the intelligence app in a state where a schedule app is executed. According to an embodiment, the user terminal 301 may display an object (e.g., an icon) 311 corresponding to the intelligence app, on the display 360. According to an embodiment, the user terminal 301 may receive a voice input by a user utterance. For example, the user terminal 301 may receive a voice input saying that "let me know the schedule of this week!". According to an embodiment, the user terminal 301 may display a user interface (UI) 313 (e.g., an input window) of the intelligence app, in which text data of the received voice input is displayed, on a display.

According to an embodiment, on screen 315, the user terminal 301 may display a result corresponding to the received voice input, on the display. For example, the user terminal 301 may receive a plan corresponding to the received user input and may display 'the schedule of this week' on the display depending on the plan.

In an embodiment, the user terminal 301 of FIGS. 3, 4, and 5 may correspond to the electronic device 101 of FIG. 1. In an embodiment, the intelligence server 400 of FIG. 3 may correspond to one of the electronic device 104 and the server 108 of FIG. 1. In an embodiment, the processor 320 of FIG. 3 may correspond to the processor 120 of FIG. 1. In an embodiment, the display 360 of FIG. 3 may correspond to the display module 160 (including display circuitry) of FIG. 1. In an embodiment, the speaker 355 of FIG. 3 may correspond to the sound output module (including sound output circuitry) 155 of FIG. 1. In an embodiment, the microphone 370 of FIG. 3 may correspond to the input module 150 of FIG. 1. In an embodiment, the communication interface 390 of FIG. 3 may correspond to the communication module 190 of FIG. 1.

Figure 6:
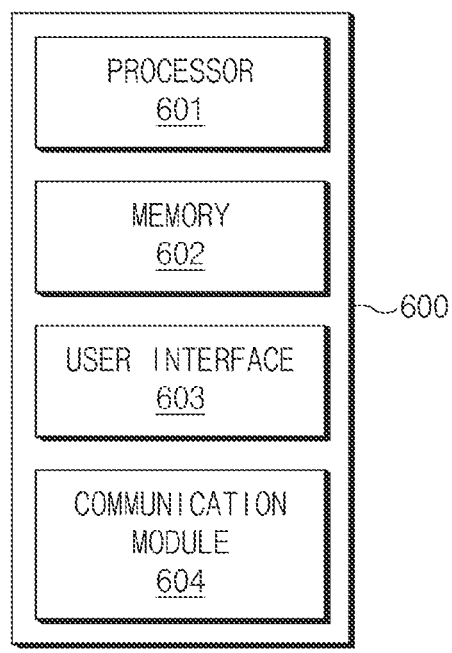
FIG. 6 is a block diagram illustrating a structure of an electronic device, according to various example embodiments.

FIG. 6 is a block diagram illustrating a structure of an electronic device 600, according to an embodiment disclosed in the specification. For clarity of description, descriptions the same as the above-mentioned descriptions may be briefly described or omitted.

Referring to FIG. 6, the electronic device 600 may include a processor 601 including processing circuitry (e.g., the processor 320 of FIG. 3 and/or the processor 120 of FIG. 1), a memory 602 (e.g., the memory 130 of FIG. 1), a user interface 603, and a communication module 604 (e.g., the communication module 190 of FIG. 1). The user interface 603 may include a microphone (not illustrated) (e.g., the microphone 370 of FIG. 3 and/or the input module 150 of FIG. 1) and a speaker (not illustrated) (e.g., the speaker 355 of FIG. 3 and/or the sound output module 155 of FIG. 1).

The electronic device 600 may further include at least one of additional components in addition to the components illustrated in FIG. 6. According to an embodiment, the components of the electronic device 600 may be the same entities or may constitute separate entities.

For example, the electronic device 600 may include a smartphone, a tablet PC, a wearable device, a home appliance, or a digital camera. According to an embodiment, the processor 601 may be operatively coupled to the communication module 604, the memory 602, and/or the user interface 603 (e.g., a microphone (not illustrated) and a speaker (not illustrated)) to perform overall functions of the electronic device 600. For example, the processor 601 may include one or more processors. For example, the one or more processors may include an image signal processor (ISP), an application processor (AP), or a communication processor (CP).

Figure 7:
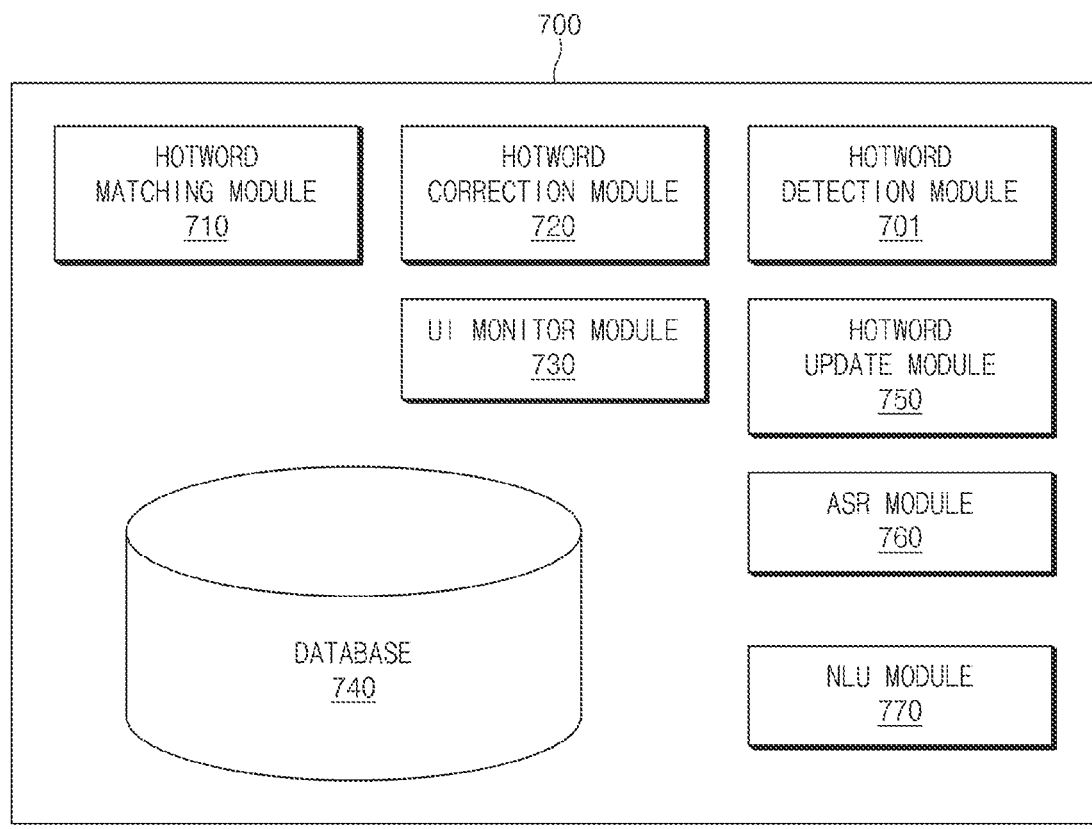
FIG. 7 is another block diagram illustrating a structure of an electronic device, according to various example embodiments.

Furthermore, the processor 601 may drive modules (e.g., a hotword detection module 701, a hotword matching module 710, a hotword correction module 720, a UI monitor module 730, a hotword update module 750, an ASR module 760 and/or an NLU module 770 of FIG. 7) by executing the instructions stored in the memory 602. Each module herein may include corresponding circuitry.

To perform overall functions of the electronic device 600, the processor 601 may be operatively connected to modules (e.g., the hotword detection module 701, the hotword matching module 710, the hotword correction module 720, the UI monitor module 730, the hotword update module 750, the ASR module 760, and/or the NLU module 770 of FIG. 7). In the embodiment disclosed in this specification, it may be understood that an operation performed (or executed) by the modules (e.g., the hotword detection module 701, the hotword matching module 710, the hotword correction module 720, the UI monitor module 730, the hotword update module 750, the ASR module 760, and/or the NLU module 770 of FIG. 7) is an operation performed by the processor 601 executing instructions stored in the memory 602. Each module herein may include corresponding circuitry.

In an embodiment, the processor 601 may include the modules (e.g., the hotword detection module 701, the hotword matching module 710, the hotword correction module 720, the UI monitor module 730, the hotword update module 750, the ASR module 760, and/or the NLU module 770 of FIG. 7). In this case, an operation performed (or executed) by each of the modules (e.g., the hotword detection module 701, the hotword matching module 710, the hotword correction module 720, the UI monitor module 730, the hotword update module 750, the ASR module 760, and/or the NLU module 770 of FIG. 7) may be implemented as at least part of the processor 601. Again, each module herein may include circuitry.

Several modules described in various embodiments of the disclosure may be implemented by hardware, software, or a combination of hardware and software.

The memory 602 may store a database (not illustrated) (e.g., the database 740 of FIG. 7) including at least one input data. The memory 602 may store commands, information, or data associated with operations of components included in the electronic device 600. For example, the memory 602 may store instructions, when executed, that cause the processor 601 to perform various operations described in the specification.

In an embodiment, the electronic device 600 may receive a user input by using the user interface 603. The user input may be an input including a user voice signal (e.g., a user's utterance input).

In an embodiment, the user input may be the user's voice input (e.g., an utterance). When the user input is a voice input, the electronic device 600 may receive a user input through a microphone (or a voice receiving device) (not illustrated).

In an embodiment, the user input may be a gesture input and/or a touch input. When the user input is a gesture input and/or a touch input, the electronic device 600 may receive a user input through a sensor (not illustrated) (e.g., the sensor module 176 of FIG. 1).

According to an embodiment, the processor 601 may include a sound module (not illustrated). The sound module may recognize a user input for executing an operation. For example, the sound module may recognize and receive the voice signal. For example, the sound module recognizing the user input may have a high speech recognition rate because ambient noise is strong.

According to an embodiment, the sound module may be learned to recognize and receive the user input by using an algorithm for recognizing a voice. For example, the algorithm for recognizing the voice may be at least one of a hidden Markov model (HMM) algorithm, an artificial neural network (ANN) algorithm, and a dynamic time warping (DTW) algorithm.

According to an embodiment, the sound module may perform tasks of data refinement, data integration, data reduction, and/or data conversion. The data refinement may include an operation of filling in incomplete data and correcting inconsistent data. The data integration may include an operation of merging various divided databases and files for easy analysis. The data reduction may include an operation of sampling only some of input data or reducing the dimension of data to be analyzed. The data conversion may include an operation of normalizing or grouping data by obtaining an average value of the data. The sound module may process data, thereby preventing/reducing meaningless values from being included in data or preventing/reducing data quality from being degraded due to unintended variables. Accuracy and timeliness may be increased through the sound module.

In an embodiment, at least one operation among operations of each component described with reference to the electronic device 600 may be performed (or executed) by an external server (not illustrated) or another electronic device (not illustrated). For example, the processor 601 may transmit a user input to the external server (not illustrated) or the other electronic device (not illustrated) by using the communication module 604.

A processor (not illustrated) included in an external server (not illustrated) or the other electronic device (not illustrated) may receive the user input, may generate response data, and may transmit the response data to the electronic device 600.

The processor 601 may receive the response data corresponding to the user input from the external server (not illustrated) or the other electronic device (not illustrated) through the communication module 604. When receiving the response data, the processor 601 may allow the response data to be output through the user interface 603. Alternatively, through the communication module 604, other devices may be controlled or data may be stored. The processor 601 may include at least one or more processors, and may be driven while being physically divided into a main processor performing high-performance processing and an auxiliary processor performing low-power processing. Alternatively, one processor may process data by switching between a high performance mode and a low power mode depending on situations.

Hereinafter, an operation of the processor 601 will be described in detail.

In an embodiment, the electronic device 600 may include the user interface 603, the processor 601 (e.g., see processor 120 in FIG. 1), and the memory 602. The memory 602 may store instructions that, when executed, cause the processor 601 to identify a modified hotword included in the first user input in response to failing to detect a hotword included in a first user input received using the user interface, to monitor a second user input received during a specified time using the user interface 603, to identify an existing hotword corresponding to the modified hotword using the second user input, to provide response data indicating whether to update the existing hotword using the modified hotword, through the user interface 603, and to update a hotword model based on a user input to the response data.

In an embodiment, the electronic device 600 may further include a sound module operatively connected to the processor or included in the processor. The instructions may cause the processor 601 to receive a voice signal included in the user input using the sound module and to cause the sound module to be trained using a learning algorithm.

In an embodiment, the instructions may cause the processor 601 to identify the modified hotword based on whether the modified hotword includes a sub-word that is a word included in the existing hotword and to monitor the second user input to a target application of the existing hotword according to the modified hotword including the sub-word.

In an embodiment, the instructions may cause the processor 601 to identify the existing hotword corresponding to the modified hotword based on whether an input for execution of a task implemented with the existing hotword is included in the second user input.

In an embodiment, the instructions may cause the processor 601 to match the first user input to the existing hotword corresponding to the task implemented with the hotword according to the input for the execution of the task implemented with the existing hotword being included in the second user input.

In an embodiment, the instructions may cause the processor 601 to match an ASR result of the modified hotword to one of the existing hotword based on the second user input being one.

In an embodiment, the instructions may cause the processor 601 to match a result using ASR of the modified hotword to one of the existing hotword using information using NLU based on the second user input including a plurality of user inputs.

In an embodiment, the instructions may cause the processor 601 to provide response data including an icon for selecting whether to replace or add the existing hotword with the modified hotword, depending on a result of matching the modified hotword to the existing hotword.

In an embodiment, the instructions may cause the processor 601 to determine an indication of user intent of the modified hotword included in the first user input and to provide a notification of the existing hotword for executing the task through the user interface based on identifying execution of a task corresponding to the indication of user intent.

In an embodiment, the instructions may cause the processor 601 to provide a notification of the existing hotword for executing a task through the user interface depending on a modified hotword included in the first user input.

FIG. 7 is another block diagram illustrating a structure of an electronic device 700, according to an embodiment disclosed in this specification. For clarity of description, descriptions the same as the above-mentioned descriptions may be briefly described or omitted.

According to an embodiment that is illustrated, the electronic device 700 may include the hotword detection module 701, the hotword matching module 710, the hotword correction module 720, the UI monitor module 730, a database 740, the hotword update module 750, the ASR module 760, and/or the NLU module 770. The listed components may be operatively or electrically connected to one another.

The hotword detection module 701, the hotword matching module 710, the hotword correction module 720, the UI monitor module 730, the hotword update module 750, and the ASR module 760 are separately illustrated in FIG. 7. However, embodiments are not limited thereto.

The hotword detection module 701 may detect a hotword included in a user input received by using a user interface (e.g., the user interface 603 of FIG. 6) of the electronic device 700. The hotword may refer to a command matched to perform a specified operation in a target application (App). The hotword may be a command phrase including at least one word. For example, command 'rejection' may be a hotword matched to perform an operation of rejecting a call received in a phone application.

In an embodiment, the hotword detection module 701 may detect a hotword from audio data included in a user input by using a hotword model.

Figure 8:
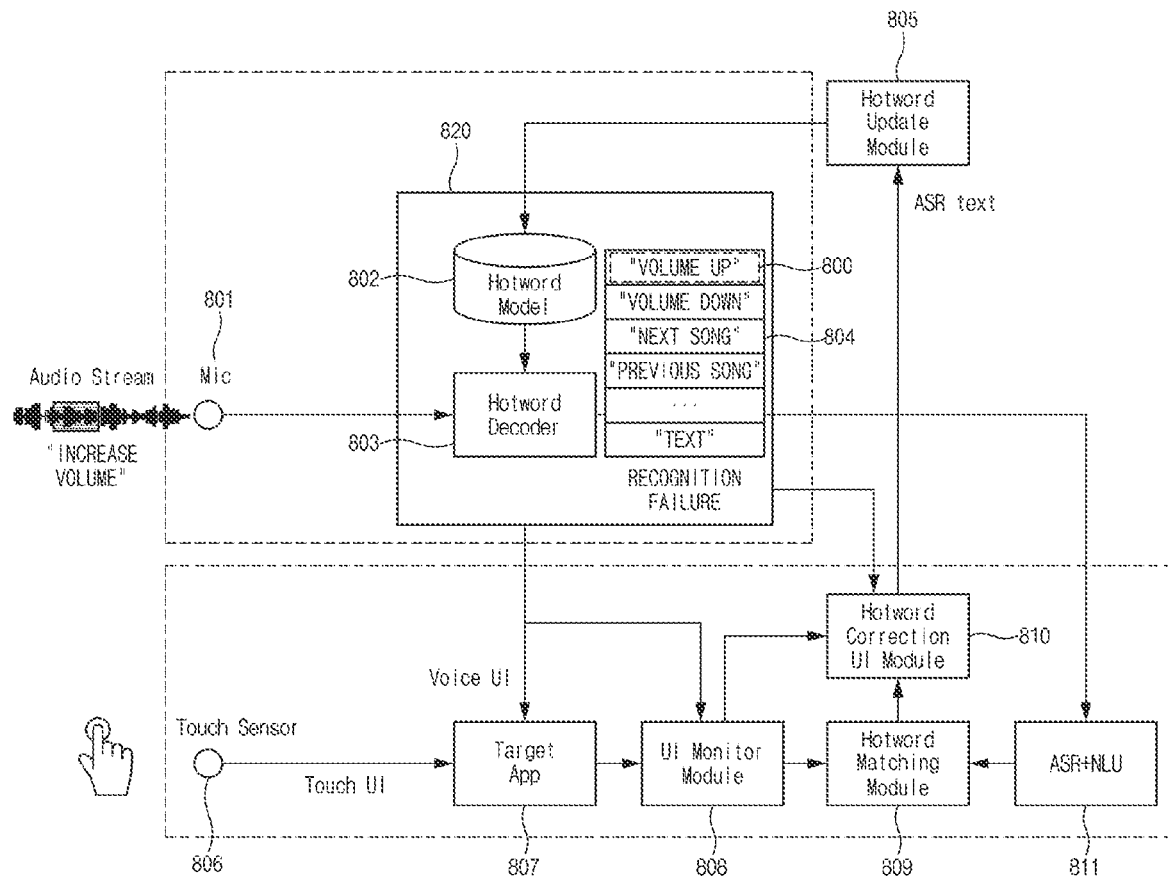
FIG. 8 is a diagram illustrating a method in which an electronic device updates a hotword model based on a user's use pattern, according to various example embodiments.

In an embodiment, the hotword model may be a model trained on a predefined hotword list (e.g., a hotword list 804 in FIG. 8). For example, a hotword model may be trained on a predefined list of hotwords by using an artificial neural network such as a deep learning network. The hotword model may calculate a value of probability that a hotword is present in audio data entered during a specific time (e.g., 24 hours). For example, the hotword model may calculate the probability value at a specified period (e.g., about every 100 msec).

In an embodiment, when a hotword is present in the input audio data, the hotword model may output a value close to 1. When the hotword is not present in the input audio data, the hotword model may output a value close to zero.

In an embodiment, the hotword model may be generated by an external server (not shown). The electronic device 700 may obtain the hotword model from the external server (not shown).

The hotword detection module 701 may perform always-on monitoring on a user input. The hotword detection module 701 may detect the predefined hotword from an audio streaming included in the user input, through the monitoring. The hotword detection module 701 may understand the meaning of the detected hotword without using an NLU module. The hotword detection module 701 may allow a target application to perform a specified operation without using the NLU module, by understanding the meaning of the detected hotword without using the NLU module. The hotword detection module 701 may allow the target application to perform a specified operation without using the NLU, and thus the hotword detection module 701 may be implemented with limited memory and/or a low-power chipset of an operation.

In an embodiment, when a hotword is detected from the audio data included in the user input, the hotword detection module 701 may allow the target application to perform an operation matching the hotword. The target application may be a target application through which a hotword detected by the hotword detection module 701 is actually performed as a task. For example, when the hotword is a "next song", the target application may be a media-related application. As another example, when the hotword is "reception", the target application may be a phone application.

In an embodiment, when a hotword is not detected from audio data included in the user input, the hotword detection module 701 may detect a sub-word. The sub-word may be a word included in the hotword.

In an embodiment, the hotword detection module 701 may call the UI monitor module 730 and/or the hotword correction module 720 based on a result of detecting the sub-word.

The UI monitor module 730 may monitor a use pattern of the electronic device 700 of a user, which is generated within a specified time, in response to the call of the hotword detection module 701.

In an embodiment, after a hotword fails to be detected, the UI monitor module 730 may monitor a user input received through a display included in the electronic device 700 or operatively connected to the electronic device 700 within a specified time. The specified time may be a predetermined time. The specified time may be set to a value different depending on the target application. The specified time may be set based on the user's use pattern.

In an embodiment, when receiving sub-word recognition information from the hotword detection module 701, the UI monitor module 730 may adjust the target application to be monitored, based on the provided sub-word recognition information.

In an embodiment, the UI monitor module 730 may determine whether the user input received within the specified time includes an input for the execution of a task implemented with a hotword. When the user input received within the specified time includes the input for the execution of a task implemented with a hotword, the UI monitor module 730 may call the hotword matching module 710 and/or the hotword correction module 720.

The hotword matching module 710 may determine whether there is a replaceable utterance among the utterances included in a hotword list in a user utterance included in the user input. For example, the hotword matching module 710 may determine the intent of the user utterance by using information received from the UI monitor module 730. When the intent of the user utterance corresponds to at least one of preset hotword tasks, the hotword matching module 710 may match the user utterance with a hotword corresponding to the hotword task.

In an embodiment, when there is a single user input received within the specified time, the hotword matching module 710 may match the result using the ASR module 760 of the audio data, which has failed to be detected, with one of the existing hotwords.

In an embodiment, when there are a plurality of user inputs received within the specified time, the hotword matching module 710 may match a result of using the ASR module 760 of audio data, which has failed to be detected, with one of the existing hotwords by using information using the NLU module 770.

The hotword correction module 720 may provide a user with the matching result of the hotword matching module 710 and may receive the user's feedback on the matching result.

In an embodiment, the hotword correction module 720 may display the matching result of the hotword matching module 710 through the display included in the electronic device 700 or operatively connected to the electronic device 700 and may receive a user input indicating whether to replace (or add) the hotword thus previously provided or to maintain the existing hotword, based on the displayed matching result.

In an embodiment, when the execution of a task provided by using a hotword is identified through the display included in the electronic device 700 or operatively connected to the electronic device 700, the hotword correction module 720 may notify the user of a predefined hotword corresponding to the task.

In an embodiment, the hotword correction module 720 may receive the result of the hotword detection module 701 through the display included in the electronic device 700 or operatively connected to the electronic device 700 and may notify the user of the predefined hotword corresponding to the task. For example, the hotword correction module 720 may receive the result of the hotword detection module indicating that the hotword detection module 701 failed to detect the hotword, but detected a sub-word, through the display included in the electronic device 700 or operatively connected to the electronic device 700 and may notify the user of the predefined hotword corresponding to the task.

As another example, when calculating the confidence score for the result of the hotword detection module 701, which is lower than a specified threshold for determining whether to detect a hotword but is close to the specified threshold, through the display included in the electronic device 700 or operatively connected to the electronic device 700 and may notify the user of a predefined hotword corresponding to the task. The hotword update module 750 may regenerate a model (e.g., a hotword model 802) for detecting a hotword. For example, the hotword update module 750 may receive the matching result from the hotword matching module 710 and may regenerate a model for detecting a hotword by using the matching result.

In an embodiment, the hotword update module 750 may update a model for detecting the hotword by using the matching result received from the hotword matching module 710 and/or a user input result received from the hotword correction module 720.

In an embodiment, the hotword update module 750 may detect a modified hotword from audio data received afterward by updating the model for detecting a hotword.

The ASR module 760 may convert the received user input into text data. For example, the ASR module 760 may convert received voice data into text data. It is illustrated that the ASR module 760 is included in the electronic device 700 in FIG. 7. However, the ASR module 760 may be included in an external device (e.g., a server) operatively connected to the electronic device 700.

The NLU module 770 may grasp the user's intent by performing syntactic analysis or semantic analysis. According to an embodiment, the NLU module 770 may grasp the meaning of words extracted from the voice input by using linguistic features (e.g., syntactic elements) such as morphemes or phrases and may determine the intent of the user by matching the grasped meaning of the words to the intent.

According to an embodiment disclosed in this specification, even after the electronic device 700 fails to detect the hotword, the electronic device 700 may update the hotword so as to perform an operation suitable for the user's intent by using a user input.

According to an embodiment disclosed in this specification, even after the electronic device 700 fails to detect the hotword, the electronic device 700 may update the hotword so as to perform an operation suitable for the user's intent by grasping the user's intent based on a user input and/or ASR result.

FIG. 8 is a diagram illustrating a method in which an electronic device updates a hotword model based on a user's use pattern, according to an embodiment disclosed in the specification.

Referring to FIG. 8, an electronic device (e.g., the user terminal 301 of FIG. 3, the electronic device 600 of FIG. 6, or the electronic device 700 of FIG. 7) may receive a user input by using a microphone Mic 801 (e.g., the user interface 603 of FIG. 6) that is operatively connected to the electronic device or included in the electronic device. The electronic device may receive an audio stream corresponding to a user utterance as a user input by using the microphone Mic 801. For example, the electronic device may receive a user input of "increase the volume" by using the microphone Mic 801.

The electronic device may determine whether the received user input is a hotword, by using a hotword detection module 820.

The electronic device may attempt hotword recognition by using a hotword list 804 and a hotword decoder 803.

In an embodiment, the hotword detection module 820 may include a hotword model 802 and the hotword decoder 803. The hotword model 802 may be a set of parameters trained from the predefined voice pattern of the hotword list 804 by using an artificial neural network. The hotword decoder 803 may provide a probability value of the degree of matching between audio data included in the user input and a hotword by using parameters.

In an embodiment, when the electronic device fails to recognize the hotword, the electronic device may determine whether a sub-word is included in the received user input. The sub-word may be a word included in the hotword. For example, when the user input, which failed to be recognized, is "increase the volume", the electronic device may determine that the user input includes "volume" which is a sub-word of the hotword "turn up the volume" (800) and/or "turn down the volume" included in the hotword list 804.

In an embodiment, the electronic device may embody a target application 807 by using the sub-word. For example, when the recognized sub-word is "volume", the electronic device may embody the target application 807 of "turn up the volume" (800) and/or "turn down the volume", which is a hotword including the "volume", as a target application of "increase the volume" that is the received user input.

In an embodiment, when the electronic device fails to recognize the hotword, the electronic device may embody the target application 807 by using an ASR and NLU module 811 (e.g., the ASR module 760 and the NLU module 770 in FIG. 7).

After the electronic device fails to detect a hotword by using the hotword detection module 820, the electronic device may monitor a user input received through a display included in the electronic device or operatively connected to the electronic device, within T time by using a UI monitor module 808. The T time may be a predetermined specified time. The specified time may be set to a value different depending on the target application. The specified time may be set based on the user's use pattern.

In an embodiment, the UI monitor module 808 may adjust a target application to be monitored as the embodied target application based on the provided sub-word recognition information.

In an embodiment, the UI monitor module 808 may determine whether the user input received within T time includes an input for the execution of a task implemented with a hotword. For example, when a touch input, via touch sensor 806, to UI for turning up the volume is received in the user input received within T time, the UI monitor module 808 may determine that the user input includes the execution of a task, which is used to turn up the volume and which is implemented with hotword "turn up the volume" (800). This will be described in detail with reference to FIG. 9.

In an embodiment, when the user input received within the T time includes an input for the execution of a task implemented with a hotword, the UI monitor module 808 may call a hotword matching module 809 and/or a hotword correction module 810.

The hotword matching module 809 may determine whether there is a replaceable utterance among the utterances included in a hotword list in a user utterance included in the user input that fails to be detected. In an embodiment, the hotword matching module 809 may determine whether there is a replaceable utterance among the utterances included in a hotword list in a user utterance included in the user input that fails to be detected, by using information received from the UI monitor module 808. For example, when receiving information about the execution of a task implemented with a hotword included in the user input received within the T time from the UI monitor module 808, the hotword matching module 809 may determine that the intent of the user utterance that has failed to detect the hotword is used to execute the task, by using the information. The hotword matching module 809 may match the user utterance to a hotword corresponding to a hotword task.

For example, the hotword matching module 809 may determine that the user intent of an input of "increase the volume", which has failed to detect the hotword, includes the execution of a task, which is used to turn up the volume and which is implemented with hotword "turn up the volume" (800). The hotword matching module 809 may match "increase the volume" to a hotword corresponding to a task of turning up the volume.

In an embodiment, when there is a single user input received within the specified time, the hotword matching module 809 may match the result using an ASR and NLU module 811 of audio data, which has failed to be detected, with one of the existing hotwords.

In an embodiment, when there are a plurality of user inputs received within the specified time, the hotword matching module 809 may match the result using information using the ASR and NLU module 811 of audio data, which has failed to be detected, with one of the existing hotwords.

The hotword correction module 810 may provide a user with the matching result of the hotword matching module 809 and may receive the user's feedback on the matching result.

In an embodiment, the hotword correction module 810 may display the matching result of the hotword matching module 809 through the display included in the electronic device or operatively connected to the electronic device and may receive a user input indicating whether to replace (or add) the hotword thus previously provided or to maintain the existing hotword, based on the displayed matching result.

Referring to FIG. 8, the hotword correction module 810 may receive a user input indicating whether to replace or add the existing hotword of "turn up the volume" (800) with a hotword of "increase the volume" thus newly matched, or to maintain only the existing hotword of "turn up the volume" (800).

In an embodiment, when the execution of a task provided by using a hotword is identified through the display included in the electronic device or operatively connected to the electronic device, the hotword correction module 810 may notify the user of a predefined hotword corresponding to the task. For example, when receiving information about the execution of a task implemented with a hotword included in the user input received within the T time from the UI monitor module 808, the hotword correction module 810 may notify a user of the predefined hotword corresponding to the task through the display by using the information.

In an embodiment, the hotword correction module 810 may receive the result of the hotword detection module 820 through the display included in the electronic device (e.g., the electronic device 700) or operatively connected to the electronic device and may notify the user of the predefined hotword corresponding to the task. For example, the hotword correction module 810 may receive the result of the hotword detection module 820 indicating that the hotword detection module 820 failed to detect the hotword, but detected a sub-word, through the display included in the electronic device (e.g., the electronic device 700) or operatively connected to the electronic device and may notify the user of the predefined hotword corresponding to the task.

A hotword update module 805 may update and/or regenerate the hotword model 802. For example, the hotword update module 805 may update and/or regenerate the hotword model 802 by using the user input result received from the hotword correction module 810.

For example, when the hotword correction module 810 receives a user input of replacing the hotword with "increase the volume" instead of "turn up the volume" (800), the hotword update module 805 may update the hotword model 802 so as to replace "turn up the volume" (800) of the hotword list 804 with "increase the volume" by using the user input result.

In an embodiment, the hotword update module 805 may detect a modified hotword from audio received afterward by updating the hotword model 802.

As shown in FIG. 8, according to an embodiment disclosed in this specification, even when inaccurate hotword data (e.g., audio data including only some sub-words) is received by using the user input received within T time, which is the specified time, the electronic device may perform a precise task.

FIG. 9 is a diagram of a method in which an electronic device determines whether a user input received within a specified time includes an input for execution of a task implemented with a hotword, according to an embodiment disclosed in this specification.

Referring to FIG. 9, when failing to detect a hotword, an electronic device or a module (e.g., the UI monitor module 808 in FIG. 8) included in the electronic device may monitor a user input (e.g. a user's touch input) received through a display included in the electronic device or operatively connected to the electronic device within T time after failing to detect the hotword. The T time may be a predetermined specified time. The specified time may be set to a value different depending on the target application. The specified time may be set based on the user's use pattern.

The electronic device or the module (e.g., the UI monitor module 808 in FIG. 8) included in the electronic device may determine whether the user input received within the T time includes the execution of a task 901 implemented with hotwords 902 and 903.

As illustrated in FIG. 9, the electronic device may receive a touch input to UI for performing task <Volume UP>, a touch input to UI for performing task <Play Previous Song>, a touch input to UI for performing task <View Lyrics>, and a touch input to UI for performing task <Reject Incoming Calls> within T time.

In an embodiment, with respect to the received plurality of touch inputs, the electronic device may match one hotword among hotwords corresponding to the plurality of touch inputs by using ASR and/or NLU information of audio data of a user input that has failed to detect the hotword.

In an embodiment, with respect to the received plurality of touch inputs, the electronic device may match one hotword among the hotwords corresponding to the plurality of touch inputs by using sub-words.

For example, when the user input that failed to be recognized is "increase the volume", the electronic device may match one of hotwords of <volume up> and <volume down> that is a task having a hotword including "volume", which is a sub-word of "turn up the volume", from among the plurality of touch input tasks thus received.

In an embodiment, the electronic device may embody a target application (e.g., the target application 807 of FIG. 8) as media 904, a phone 905, and a message 906 by using the sub-word. For example, when the recognized sub-word is "volume", the electronic device may embody the target application of "turn up the volume", which is a hotword including "volume", as the media 904, which is a target application of "increase the volume" that is a user input that has failed to detect the hotword.

Hereinafter, according to an embodiment disclosed in the specification, a method in which an electronic device improves a capability of detecting a modified hotword will be described with reference to FIG. 10.

Figure 10:
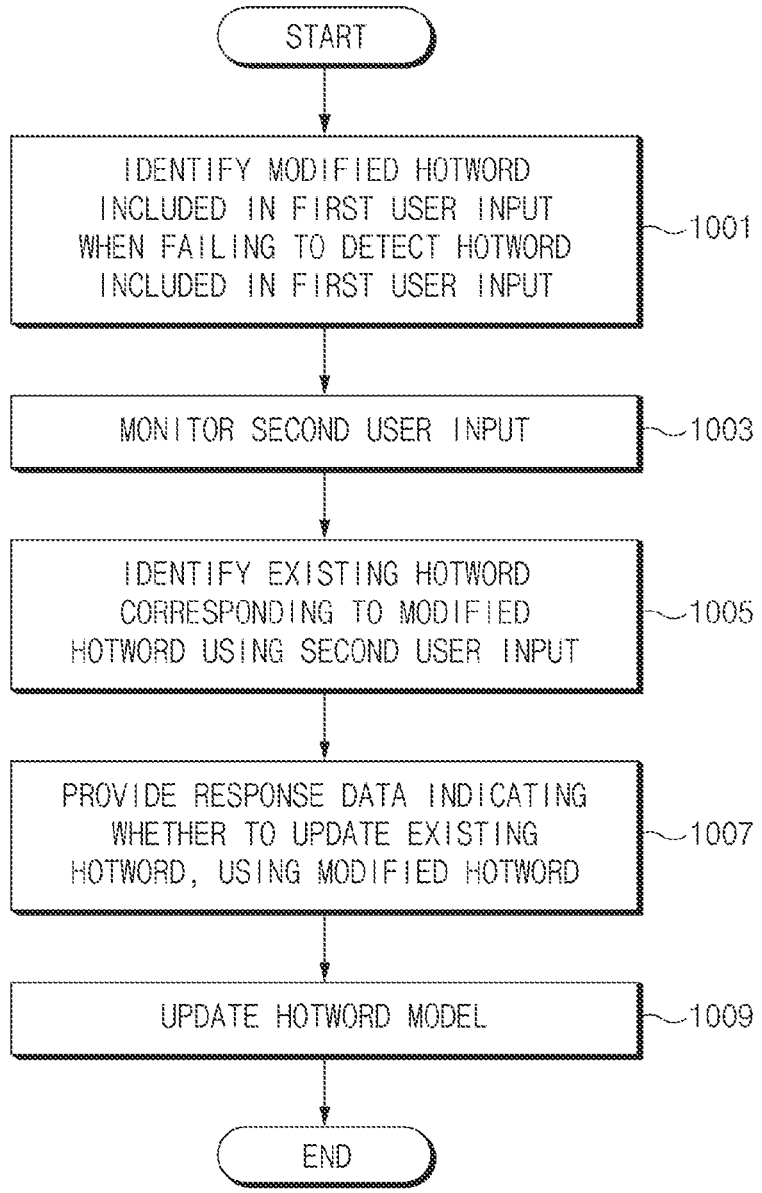
FIG. 10 is a flowchart of a method, in which an electronic device improves hotword detection performance, according to various example embodiments.

FIG. 10 is a flowchart 1000 of a method, in which an electronic device improves hotword detection performance, according to an embodiment disclosed in the specification. According to an embodiment, it may be understood that the process illustrated in FIG. 10 is performed by a processor (e.g., the processor 120 of FIG. 1) of an electronic device (e.g., the electronic device 101 of FIG. 1) by executing instructions stored in a memory (e.g., the memory 130 of FIG. 1).

In operation 1001, when failing to detect a hotword included in a first user input, the electronic device may identify a modified hotword included in the first user input. The hotword may refer to a command matched to perform a specified operation in a target application (App). The hotword may be a command phrase including at least one word. For example, command 'rejection' may be a hotword matched to perform an operation of rejecting a call received in a phone application. As the electronic device understands the meaning of the detected hotword without using the NLU module, the hotword may allow a target application to perform a specified operation without using the NLU module. The electronic device may allow the target application to perform a specified operation without using the NLU, and thus the electronic device may be implemented with limited memory or a low-power chipset of an operation.

The modified hotword may be a command phrase similar to the hotword having the intent for performing the same task as the hotword. For example, the modified hotword may bea command phrase including a sub-word. The sub-word may be a word included in the hotword.

In operation 1003, the electronic device may monitor the second user input. In an embodiment, the electronic device may monitor the user's use pattern by monitoring the second user input that occurs within a specified time. The specified time may be a predetermined time. The specified time may be set to a value different depending on the target application. The specified time may be set based on the user's use pattern.

In an embodiment, when the modified hotword includes a sub-word, the electronic device may adjust the target application to be monitored, based on the sub-word information.

In operation 1005, the electronic device may identify an existing hotword corresponding to the modified hotword by using the second user input.

In an embodiment, the electronic device may determine whether the second user input received within the specified time includes an input for the execution of a task implemented with a hotword. When the user input received within the specified time includes the input for the execution of a task implemented with a hotword, the electronic device may determine whether there is a replaceable utterance among utterances included in the hotword list for performing the task.

In operation 1007, the electronic device may provide response data indicating whether to update the existing hotword, by using the modified hotword.

The response data may be data indicating a result of matching the modified hotword with the existing hotword.

In an embodiment, when there is a single second user input received within the specified time, the electronic device may match the result using an ASR module (e.g., 760 in FIG. 7) of the audio, which has failed to be detected, to one of the existing hotword lists. The electronic device may provide the matching result to a user and may receive the user's feedback on the matching result.

In an embodiment, when there are a plurality of second user inputs received within the specified time, the electronic device may match the result using the ASR module (e.g., 760 of FIG. 7) of audio data, which has failed to be detected, with one of the existing hotword lists by using information using an NLU module (e.g., 770 in FIG. 7).

In an embodiment, the electronic device may display response data including the matching result through a display included in the electronic device or operatively connected to the electronic device and may receive a user input indicating whether to replace (or add) an existing hotword with a modified hotword or to maintain the existing hotword as the displayed matching result.

In operation 1009, the electronic device may update a hotword model based on a user input to the response data. The hotword model may be a model for detecting the hotword. The electronic device may detect the modified hotword from the audio received afterward, by updating a model for detecting the hotword by using the hotword update module 750.

In an embodiment, a method performed by an electronic device may include identifying a modified hotword included in the first user input in response to failing to detect a hotword included in a first user input received using a user interface included in the electronic device or connected to the electronic device, monitoring a second user input received during a specified time using the user interface, identifying an existing hotword corresponding to the modified hotword using the second user input, providing response data indicating whether to update the existing hotword using the modified hotword, using the user interface, and updating a hotword model based on a user input to the response data.

In an embodiment, the method performed by the electronic device may further include receiving a voice signal included in the user input using a sound module included in the electronic device or operatively connected to the electronic device; and causing the sound module to be learned using a learning algorithm.

In an embodiment, the method performed by the electronic device may further include identifying the modified hotword based on whether the modified hotword includes a sub-word that is a word included in the existing hotword and monitoring the second user input to a target application of the existing hotword according to the modified hotword including the sub-word.

In an embodiment, the method performed by the electronic device may further include identifying the existing hotword corresponding to the modified hotword based on whether an input for execution of a task implemented with the existing hotword is included in the second user input.

In an embodiment, the method performed by the electronic device may further include matching the first user input to the existing hotword corresponding to the task implemented with the hotword according to the input for the execution of the task implemented with the existing hotword being included in the second user input.

In an embodiment, the method performed by the electronic device may further include matching an ASR result of the modified hotword to one of the existing hotword based on the second user input being one.

In an embodiment, the method performed by the electronic device may further include matching a result using ASR of the modified hotword to one of the existing hotword using information using NLU based on the second user input including a plurality of user inputs.

In an embodiment, the method performed by the electronic device may further include providing response data including an icon for selecting whether to replace or add the existing hotword with the modified hotword, depending on a result of matching the modified hotword to the existing hotword.

In an embodiment, the method performed by the electronic device may further include determining user intent of the modified hotword included in the first user input and providing a notification of the existing hotword for executing the task through the user interface based on identifying execution of a task corresponding to the user intent.

In an embodiment, the method performed by the electronic device may further include providing a notification of an existing hotword for executing a task through the user interface depending on a modified hotword included in the first user input.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a user interface;
at least one processor, comprising processing circuitry, operatively connected to the user interface; and
a memory operatively connected to the at least one processor,
wherein the memory stores a plurality of existing hotwords and information about a plurality of tasks corresponding to each of the plurality of existing hotwords,
wherein the memory stores instructions that, when executed, are configured to cause the at least one processor to:
determine that a first user input includes a modified hotword in response to failing to detect at least one of existing hotword from the first user input received via the user interface;
identify the modified hotword based on whether the modified hotword includes a sub-word that is included in at least one existing hotword among the plurality of existing hotwords based on determination that the first user input includes the modified hotword;
identify a user intent of the modified hotword included in the first user input;
monitor at least one second user input related to a target application associated with the at least one existing hotword including the sub-word received during a specified time after determining that the first user input includes the modified hotword via the user interface, wherein the first and second user inputs are different types of input;
identify an existing hotword corresponding to the modified hotword based on the at least one of the user intent of the modified hotword or information related to the at least one second user input;
provide response data indicating whether to update the existing hotword based on the modified hotword, through the user interface; and
update a hotword model based on a user input to the response data.

2. The electronic device of claim 1, further comprising:
a sound module operatively connected to the at least one processor and/or included in the processor,
wherein the instructions are configured to cause the processor to:
receive a voice signal included in the user input via the sound module; and
cause the sound module to be trained based on a learning algorithm.

3. The electronic device of claim 1, wherein the instructions are configured to cause the processor to:
identify the existing hotword corresponding to the modified hotword based on whether an input for execution of a task related to one of an existing hotword among the plurality of existing hotwords is included in the at least one of second user input.

4. The electronic device of claim 1, wherein the instructions are configured to cause the processor to:
based on the second user input being one, match an ASR result of the modified hotword to one of the existing hotword.

5. The electronic device of claim 1, wherein the instructions are configured to cause the processor to:
based on the second user input including a plurality of user inputs, match a result using ASR of the modified hotword to one of the existing hotword using information using NLU.

6. The electronic device of claim 1, wherein the instructions are configured to cause the processor to:
provide response data including an icon for selecting whether to replace and/or add the existing hotword with the modified hotword, based on a result of matching the modified hotword to the existing hotword.

7. The electronic device of claim 1, wherein the instructions are configured to cause the processor to:
based on identifying execution of a task corresponding to the indication of user intent, provide a notification of the existing hotword for executing the task through the user interface.

8. A method performed by an electronic device, the method comprising:
determining that a first user input includes a modified hotword, in response to failing to detect at least one of existing hotword from the first user input received via a user interface of the electronic device or connected to the electronic device;
identifying the modified hotword based on whether the modified hotword includes a sub-word that is included in at least one existing hotword among the plurality of existing hotwords based on determination that the first user input includes the modified hotword;
identifying a user intent of the modified hotword included in the first user input;
monitoring at least one of second user input related to a target application associated with the at least one existing hotword including the sub-word, received during a specified time after determining that the user first input includes the modified hotword using the user interface, wherein the first and second user inputs are different types of input;

identifying an existing hotword corresponding to the modified hotword based on the at least one of the user intent of the modified hotword or information from the at least one of second user input;

providing response data indicating whether to update the existing hotword using at least the modified hotword; and updating a hotword model based on a user input to the response data.

9. The method of claim 8, further comprising:
receiving a voice signal included in the user input using a sound module included in the electronic device or operatively connected to the electronic device; and
causing the sound module to be learned using a learning algorithm.

10. The method of claim 8, further comprising:
identifying the existing hotword corresponding to the modified hotword based on whether an input for execution of a task related to one of an existing hotword among the plurality of existing hotwords is included in the at least one of second user input.

11. The method of claim 8, further comprising:
based on the second user input being one, matching an ASR result of the modified hotword to one of the existing hotword.

12. The method of claim 8, further comprising:
based on the second user input including a plurality of user inputs, matching a result using at least ASR of the modified hotword to one of the existing hotword using information using NLU.

13. The method of claim 8, further comprising:
providing response data including an icon for selecting whether to replace or add the existing hotword with the modified hotword, based on a result of matching the modified hotword to the existing hotword.

14. The method of claim 8, further comprising:
based on identifying execution of a task corresponding to the indication of user intent, providing a notification of the existing hotword for executing the task through the user interface.

* * * * *